UNITED STATES PATENT OFFICE.

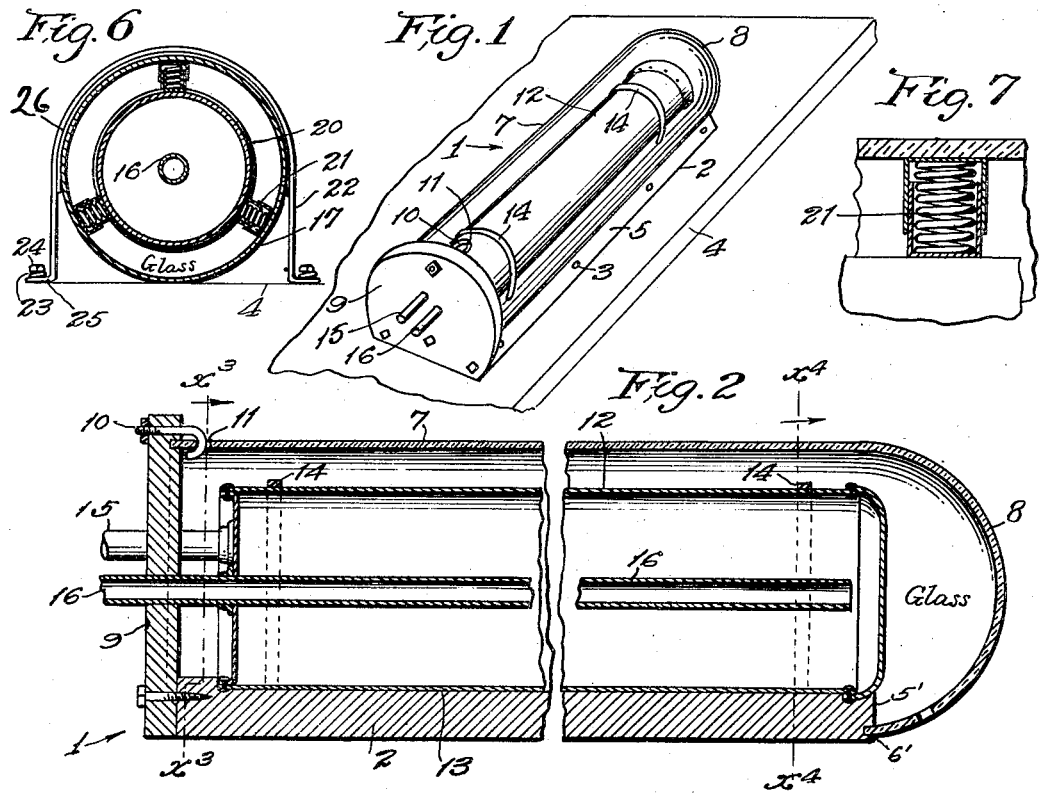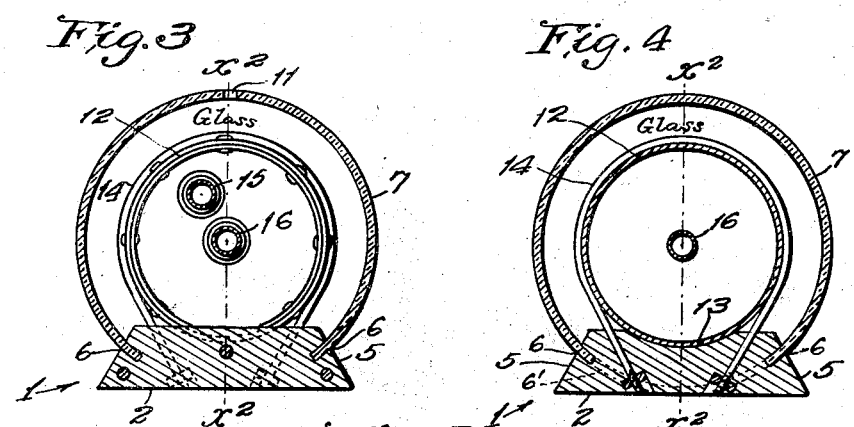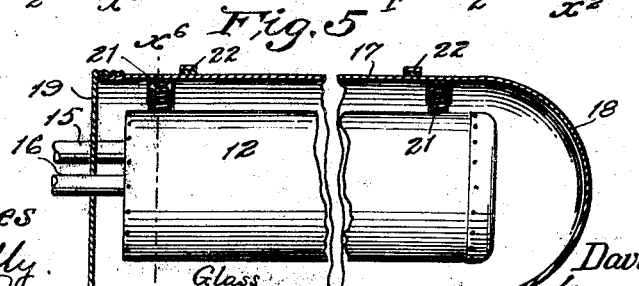

DAVID A. HARRISON, OF LOS ANGELES, CALIFORNIA.

SOLAR WATER-HEATER.

1,068,650.   Specification of Letters Patent.   Patented July 29, 1913.

Application filed January 2, 1912. Serial No. 669,122.

*To all whom it may concern:*

Be it known that I, DAVID A. HARRISON, a citizen of the United States, residing at Los Angeles, in the county of Los Angeles and State of California, have invented a new and useful Solar Water-Heater, of which the following is a specification.

An object of the invention is to provide a structure of this character whereby the direct rays of the sun may be given the greatest freedom of access to and focal effect upon the water or other liquid container during practically the entire day.

Other objects of the invention are strength, simplicity and cheapness of construction, also to permit of unequal expansion and contraction of the container and jacket, without any loosening effect at the joints.

The invention in general consists of a fluid-container mounted in such relation to a transparent single-walled jacket as will insure direct action of the solar heat on the larger part of the circumference and on one end of the container, the jacket being formed for this purpose with a transparent cap on one of its ends and closed at its other end by a removable head.

I am aware that a cylindrical double-walled or vacuum-chambered jacket has heretofore been employed in the art, but my single-walled jacket is cheaper to manufacture than such jacket and will be less obstructive to the solar rays of which a maximum amount will be transmitted to the fluid container, owing to the novel mounting whereby said rays will have access to three-quarters or more of the surface of the container.

The accompanying drawings illustrate the invention.

Figure 1 is a perspective view of a solar water heater built in accordance with this invention and fastened to a gable-roof, a fragment of which is shown. Fragments of inlet and outlet pipes are also shown. Fig. 2 is a broken vertical mid-section of the heater shown in Fig. 1, on line indicated by $x^2$, Figs. 3 and 4. Fig. 3 is a sectional end elevation on irregular line indicated by $x^3$—$x^3$, Fig. 2. Fig. 4 is a sectional end elevation on line indicated by $x^4$—$x^4$, Fig. 2. Fig. 5 is a view of the invention applied with a jacket formed of glass extending entirely around the container. Fig. 6 is a sectional elevation on line indicated by $x^6$—$x^6$, Fig. 5. Fig. 7 is an enlarged detail of some of the parts in Figs. 5 and 6.

Arrows on the section lines of the various views indicate the direction of sight.

The solar water heater 1 is provided with a base 2 of any suitable material as wood, and which may be fastened to the structure of the building on which it is used by screws or nails indicated at 3, and is shown in Fig. 1 fastened to a gable-roof 4. It is understood that the heater may be mounted directly on a flat roof or that a suitable frame mounting may be interposed between the heater and the flat roof to give a desirable slant to the heater, such mounting being well known in the art. The base 2 is provided with beveled sides 5 through which the fastening means 3 may be passed and the sides 5 and end 5' of the base are provided with grooves 6, 6' respectively to receive the opposite edges of a more or less transparent semi-cylindrical single-walled jacket 7, preferably of glass, thus providing the greatest freedom of access of the sun's direct rays to the interior of the jacket from base to top. The jacket 7 is hermetically sealed at its ends and in the drawings is provided for this purpose at one end with a semi-spherical cap 8, preferably of the same material as and integral with the jacket; and is provided at its other end with a head 9 of wood or the like which is screwed or otherwise fastened to the base 2, and which is annularly grooved to receive the end of the jacket. The head 9 is provided with a hook-bolt 10 which may be hooked through a perforation 11 in the jacket to hold the head and jacket together. The perforation 11 may be gasketed or otherwise sealed by any of the well-known methods of sealing orifices. The jacket 7 is provided interiorly with a cylindrical water-container which may be an ordinary range water boiler 12 that may rest in a segmental seat 13 in the base 2 and that may be secured to the base by suitable means as any desired number of tie-rods or bands 14, two of which are shown and which encircle the jacket and are bolted through the base 2. By this construction it is seen that the sun's rays enter the interior of the jacket 7 and have access to fully three-quarters of the circumference of the water-container 12 along substantially the full length of the container and also have access to the cap end of the container, so that the container will receive the sun's rays during the entire day and will have one of its sides fully exposed to the first and last direct rays that strike across the roof at morning and evening, respectively; it being only necessary that the heater be placed in the appropriate position according to the judgment of the constructor.

In Fig. 1 the heater 1 is placed with the cap end uppermost as though the sun's rays through the entire day were at such angles relative to the longitudinal axis of the heater as not to be obstructed by the head 9 and it is understood that under conditions where such position of the heater would cause the head to obstruct any of the sun's rays at any time during the day the heater may be attached with the head end uppermost. The container 12 is provided with pipes 15, 16, either of which may be inlet or outlet according as the heater is mounted with its cap end uppermost as in Fig. 1 or with its head end uppermost; the pipe 15 opening through the head end of the container and the pipe 16 passing through said end to within a short distance of the cap end of the container, so that either pipe as the case may be will draw off the heated water at the cap end or head end as the case may be, and the water will pass slowly from end to end of the boiler, thus maintaining a large body of hot water in the boiler.

The heater 1 shown in the drawings and hereinbefore described may be considered as a unit complete in itself or may be considered as one of a plurality of units forming a battery of heaters, only one of which is shown; in which latter case the heaters will be installed at proper intervals along the structure and may be connected in series or in multiple as desired; and the heater unit shown and described employs a fluid-retainer which may be an ordinary range boiler, but it is understood that the retainer may be made any size within the judgment of the constructor, and that the other parts may be suitably proportioned to the retainer. The heater 1 will be installed on the structure, with one end preferably raised and in such position as will insure constant exposure of the container to the direct solar rays throughout the day. The pipes 15, 16 will be appropriately connected to the supply main and hot water pipe respectively, not shown, if the cap end of the heater is uppermost or will be reversely connected if the head end is uppermost. Upon exposure to the solar rays the water or other fluid in the container will be heated and will rise to the cap end or head end, as the case may be, whereupon the heated liquid may be drawn off for any desired purpose.

The construction and arrangement of the various parts will effect maximum heating of the water in a minimum amount of time.

In Figs. 5 and 6 the jacket 17 is in the form of a cylinder closed at one end by the hemispherical head 18 of integral construction with the jacket; and the other end is closed by the removable transparent head 19 screwed or otherwise fastened thereon. The fluid container 20 is supported inside the jacket 17 by suitable yielding supports 21. The straps 22 that hold the cylindrical jacket 17 in place on the roof or other main support or base are preferably yieldingly mounted, there being springs 23 held down by means of bolts 24 that slide through the feet 25 of the straps and are fixed to the main support.

In practice the springs 21 and 23 compensate for the expansion and contraction that might otherwise break the glass. A yielding cushion 26 of rubber or other suitable material may also be interposed between the straps and the top of the glass cylinder.

It is understood that the apparatus is adapted for heating any kind of fluid.

From the foregoing it is clear that the jacket is supported in such manner that the rays from the source of radiant energy may pass without obstruction through the top and sides of the jacket to substantially three-quarters of the circumference of the container so as to get the full power of the sun from morning until evening without it being necessary to alter the positions of the jacket, the container or the support. This result is unique and enables me to obtain maximum efficiency of the heater throughout the day without any attention whatsoever.

I claim:—

1. A solar water heater comprising a flat base, a cylindrical container mounted on the base, a semi-cylindrical transparent single-walled jacket fastened in the base and closed at one end with a transparent cap, a head to close the other end of the jacket, and inlet and outlet pipes passing through the head and connected to the container.

2. A solar water heater comprising a grooved flat base; a cylindrical container mounted on the base; a semi-cylindrical transparent jacket having edges fitting the base grooves and formed with one end closed; a head to close the other end of the jacket and fastened to the base and provided with an annular groove to receive the end edge of the jacket; and inlet and outlet pipes passing through the head and connected to the container.

3. A solar liquid heater comprising a heater base; a glass cylinder on such base; a container inside the cylinder; yielding supports arranged radially of the cylinder between the cylinder and the container; and yielding means to secure the cylinder to the heater base.

4. The combination with a support of a glass cylinder resting on the support; a strap to hold the cylinder on the support; there being feet at the ends of the strap; springs on the feet; and means in adjustable relation to the feet to hold the springs down on the feet; thereby yieldingly holding the feet on the support.

5. A solar heater comprising a stationary base; a jacket mounted above the base; and a container mounted interiorly of the jacket; said stationary base allowing access of the sun's rays to the top, sides, and ends of said jacket.

In testimony whereof, I have hereunto set my hand at Los Angeles, California, this 23d day of December, 1911.

D. A. HARRISON.

In presence of—
   JAMES R. TOWNSEND,
   M. BEULAH TOWNSEND.